United States Patent
Mathur

(10) Patent No.: US 6,400,747 B1
(45) Date of Patent: Jun. 4, 2002

(54) QUADRILATERAL ASSEMBLY FOR COHERENT JET LANCING AND POST COMBUSTION IN AN ELECTRIC ARC FURNACE

(75) Inventor: Pravin Chandra Mathur, Dobbs Ferry, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/859,483

(22) Filed: May 18, 2001

(51) Int. Cl.[7] .......................... H05B 11/00; F27D 23/04; C21C 5/48
(52) U.S. Cl. .................. 373/1; 373/9; 373/85; 266/219
(58) Field of Search .............................. 373/1, 8, 9, 60, 373/85, 22, 24, 72; 266/219, 222, 224, 47; 75/526, 530

(56) References Cited

U.S. PATENT DOCUMENTS

| | | | |
|---|---|---|---|
| 3,427,151 A | 2/1969 | Koudelka et al. ............... | 75/59 |
| 4,622,007 A | 11/1986 | Gitman ........................ | 432/13 |
| 5,572,544 A | 11/1996 | Mathur et al. ................. | 373/8 |
| 5,681,526 A | 10/1997 | Zhang ......................... | 266/47 |
| 5,714,113 A | 2/1998 | Gitman et al. ............... | 266/182 |
| 5,814,125 A | 9/1998 | Anderson et al. ............. | 75/414 |
| 5,823,762 A | 10/1998 | Anderson et al. ............. | 431/8 |
| 6,096,261 A | 8/2000 | Anderson et al. ............. | 266/225 |
| 6,125,133 A | 9/2000 | Mathur et al. ................. | 373/8 |
| 6,139,310 A | 10/2000 | Mahoney et al. ............... | 431/8 |
| 6,142,764 A | 11/2000 | Anderson et al. ............. | 431/8 |
| 6,171,544 B1 | 1/2001 | Anderson et al. ............. | 266/47 |
| 6,176,894 B1 | 1/2001 | Anderson et al. ............. | 75/414 |

FOREIGN PATENT DOCUMENTS

EP        1050590        11/2000

*Primary Examiner*—Tu Ba Hoang
(74) *Attorney, Agent, or Firm*—Stanley Ktorides

(57) ABSTRACT

A quadrilateral assembly in an electric arc furnace wall for providing one or more coherent jets into the furnace and for providing preferably a plurality of post combustion oxidant streams into the furnace, preferably for forming a post combustion oxidant sheet.

16 Claims, 2 Drawing Sheets

QUADRILATERAL ASSEMBLY FOR COHERENT JET LANCING AND POST COMBUSTION IN AN ELECTRIC ARC FURNACE

TECHNICAL FIELD

This invention relates generally to electric arc furnace practice and, more particularly, to coherent jet practice in an electric arc furnace.

BACKGROUND ART

A recent significant advancement in the field of gas dynamics is the development of coherent jet technology which produces a laser-like jet of gas which can travel a long distance while still retaining substantially all of its initial velocity and with very little increase to its jet diameter. One very important commercial use of coherent jet technology is in electric arc furnace practice such as for providing gas for lancing. Any improvement in coherent jet practice in conjunction with electric arc furnace operation would be very desirable.

Accordingly it is an object of this invention to provide a system wherein coherent jet practice and other operations of an electric arc furnace may be carried out with greater effectiveness.

SUMMARY OF THE INVENTION

The above and other objects, which will become apparent to those skilled in the art upon a reading of this disclosure, are attained by the present invention, one aspect of which is:

A quadrilateral assembly suitable for installation into a wall of an electric arc furnace comprising a coherent jet opening for providing a coherent jet of gas at a first downward angle into the electric arc furnace, a carbon injection nozzle below and/or to the side of the coherent jet opening, and at least one post combustion nozzle for providing at least one oxidant stream into the electric arc furnace, said oxidant stream(s) being at a second downward angle which is shallower than said first downward angle.

Another aspect of the invention is:

A quadrilateral assembly suitable for installation into a wall of an electric arc furnace comprising a coherent jet opening for providing a coherent jet of gas at a downward angle into the electric arc furnace, a carbon injection nozzle below and/or to the side of the coherent jet opening, and a plurality of post combustion nozzles for providing a plurality of oxidant streams into the electric arc furnace, said post combustion nozzles oriented such that the oxidant streams converge to form a sheet of gas within the electric arc furnace.

A further aspect of the invention is:

A method for providing gas into an electric arc furnace comprising passing a coherent jet of gas from a coherent jet opening of a quadrilateral assembly downwardly into the electric arc furnace at a first downward angle, passing a first stream of post combustion oxidant from a first post combustion nozzle of the quadrilateral assembly into the electric arc furnace at a second downward angle which is shallower than said first downward angle, passing a second stream of post combustion oxidant from a second post combustion nozzle of the quadrilateral assembly into the electric arc furnace at an angle so as to converge with the first stream of post combustion oxidant, and forming a sheet of post combustion oxidant from said first and second streams of post combustion oxidant within the electric arc furnace.

As used herein, the term "coherent jet" means a stream of gas whose diameter remains substantially constant along its length. A coherent jet is typically surrounded by, i.e. is within, a flame envelope, and typically has a supersonic velocity.

As used herein, the term "lancing" means providing gas from a gas stream above the surface of a liquid into the liquid.

As used herein, the term "post combustion" means providing oxidant into an electric arc furnace for combustion with combustible matter above the surface of molten metal within the surface.

DETAILED DESCRIPTION

Figure 1:
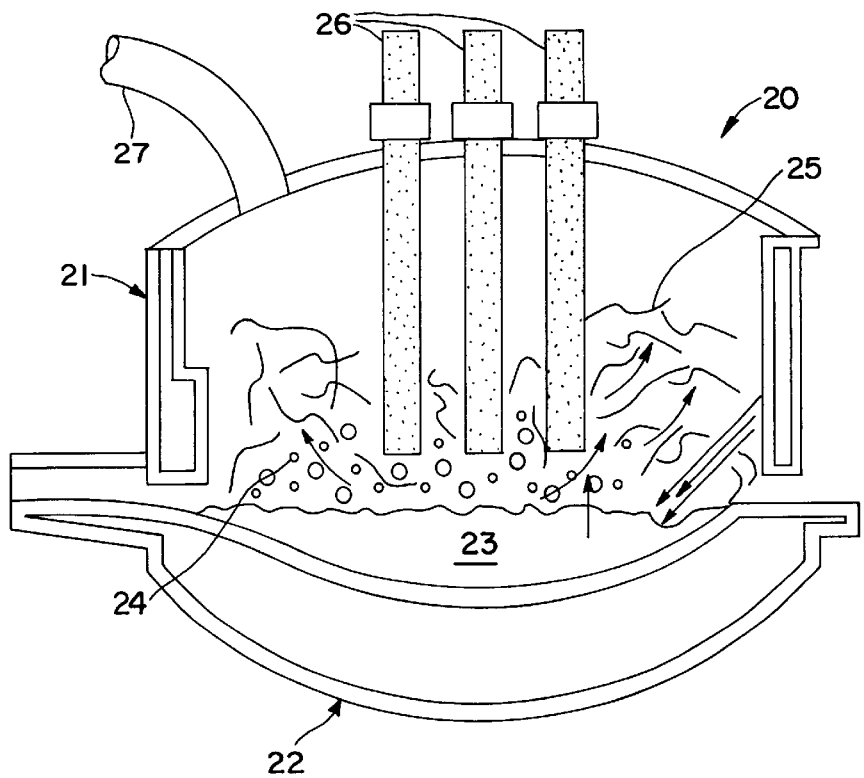
FIG. 1 is a cross sectional representation of the operation of an electric arc furnace.

The invention will be described in detail with reference to the Drawings. Referring now to FIG. 1, there is shown electric arc furnace 20 having sidewall 21 and bottom wall 22 and containing a bath comprising a pool of molten metal 23. Generally the metal will comprise iron or steel. Slag layer 24, which may be molten or solid is also illustrated above the pool of molten metal, and scrap metal layer 25 is shown above slag layer 24. The slag layer generally comprises one or more of calcium oxide, silicon dioxide, magnesium oxide, aluminum dioxide and iron oxide. The scrap layer, if present, is melted by heat provided by electrodes 26 to form molten metal pool 23. The molten metal pool comprises, in addition to metal, oxidizeable matter such as carbon and/or hydrocarbons. Exhaust is passed out of the furnace using exhaust conduit 27.

Gas is passed into the furnace from the sidewall for lancing or for combustion to assist in scrap melting and/or maintaining a sufficient temperature to ensure molten conditions. Gas may also be passed into the furnace for post combustion. Moreover, carbonaceous material may be passed into the furnace for mixture with the molten metal for combustion with lanced oxygen. Heretofore such operations have been carried out separately, i.e. using separate assemblies, and/or using imperfectly fitting cylindrical conduits in the walls of the furnace. The invention provides significant advantages over conventional practice.

In the practice of this invention, lancing gas, post combustion oxidant and carbonaceous material are all provided into the electric arc furnace using a quadrilateral assembly. Preferably the quadrilateral assembly has 90 degree included angles. One or more such quadrilateral assemblies may be used with a furnace.

Figure 2:
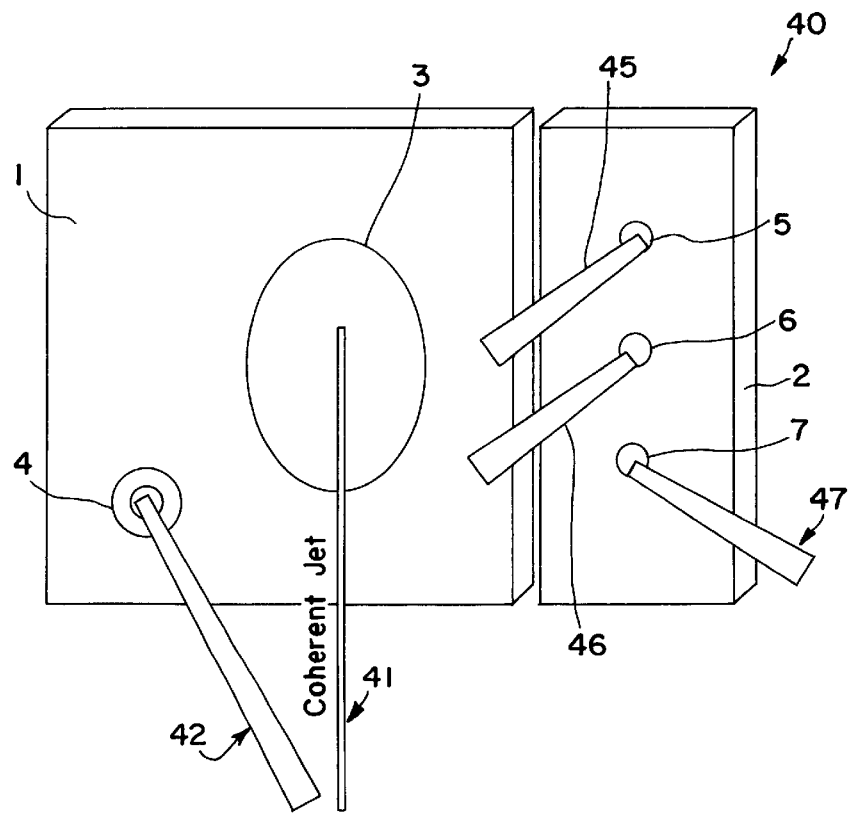
FIG. 2 is a head on view of one preferred embodiment of the quadrilateral panel or assembly of this invention.

Referring now to FIG. 2, quadrilateral assembly 40 comprises first quadrilateral portion 1, which in this embodiment is a square, and second quadrilateral portion 2, which in this embodiment is a rectangle. Quadrilateral assembly 40 is suitable for installation into a sidewall, preferably flush with the sidewall, of an electric arc furnace, positioned so as to provide gas into the furnace as illustrated in FIG. 1. The assembly is typically water cooled and typically about four inches thick. Typical dimensions for portion 1 are 12×12 inches and for portion 2 are 6×12 inches although any other suitable dimensions may be used. Portion 2 may be on the left, on the right or above portion 1.

Coherent jet opening 3 is positioned in portion 1 of quadrilateral assembly 40. Typically assembly 40 is located in the wall 21 of the furnace such that coherent jet opening 3 is from 24 to 50 inches above the surface of the molten metal. Coherent jet opening 3 houses a coherent jet injector which provides a coherent jet 41 into the furnace at a first downward angle toward the molten metal. The first downward angle is typically within the range of from 35 to 50 degrees to the horizontal, preferably about 40 degrees. Coherent jet 41 may be injected straight into the furnace relative to the sides of quadrilateral assembly 40 as shown in FIG. 2, or may be angled sideways to the left or right. If angled sideways, the sideways angle should not exceed 30 degrees and preferably should not exceed 20 degrees. U.S. Pat. Nos. 5,814,125 and 6,096,261, for example, may be referred to for information describing methods and structures for generating coherent jets. Typically the coherent jet injector will comprise a converging/diverging nozzle and a flame envelope provision means in a ring around the converging/diverging nozzle. Any gas may be used as the gas for making up the coherent jet. Examples for such gases include pure oxygen or oxygen-enriched air, which are particularly useful when the gas is used for combustion in the electric arc furnace, and an inert gas, such as argon, or mixtures of one or more inert gases, which are particularly useful when the gas is used for stirring in the electric arc furnace.

Below and/or to the side, preferably below and to the side, of coherent jet opening 3 of quadrilateral assembly 40 is carbon injector nozzle 4 which is used to provide a stream 42 of carbonaceous material into the furnace. The carbonaceous material is typical powdered coal in a carrier gas, but may also be liquid, e.g. oil, or even gaseous, e.g. methane, propane, etc. The carbonaceous material stream 42 is directed toward the molten metal and is preferably oriented at an angle such that the carbonaceous stream 42 and the coherent jet 41 impinge on the molten metal bath at about the same point. In the case where the coherent jet is angled sideways, the carbon injector nozzle preferably is on the side where the. jet is angled so as to minimize the length the carbonaceous stream has to travel before meeting the coherent jet at the bath.

The quadrilateral assembly also includes at least one post combustion nozzle. In the embodiment illustrated in FIG. 2, post combustion nozzles 5, 6 and 7 for providing post combustion oxidant into the furnace are located in quadrilateral assembly 40. In the embodiment illustrated in FIG. 2 the plurality of post combustion nozzles 5, 6 and 7 are located in quadrilateral portion 2 of quadrilateral assembly 40. Each post combustion nozzle provides a stream 45, 46 and 47 respectively of oxidant for post combustion within the furnace. The oxidant may be air, oxygen-enriched air or pure oxygen. Generally the post combustion oxidant has an oxygen concentration of at least 70 mole percent, preferably at least 90 mole percent, most preferably at least 95 mole percent. The post combustion oxidant stream or streams have a generally subsonic velocity, generally within the range of from 100 to 980 feet per second and typically within the range of from 0.20 to 0.75 Mach.

FIG. 2 illustrates one preferred embodiment wherein the plurality of post combustion oxidant streams are each passed into the furnace at a second downward angle which is shallower than the first downward angle and is generally within the range of from 20 to 30 degrees to the horizontal. The post combustion oxidant streams could all be at the same downward or sideway angles although generally they are at different downward angles so as to better cover the area of the molten metal where carbon monoxide evolution occurs.

Figure 3:
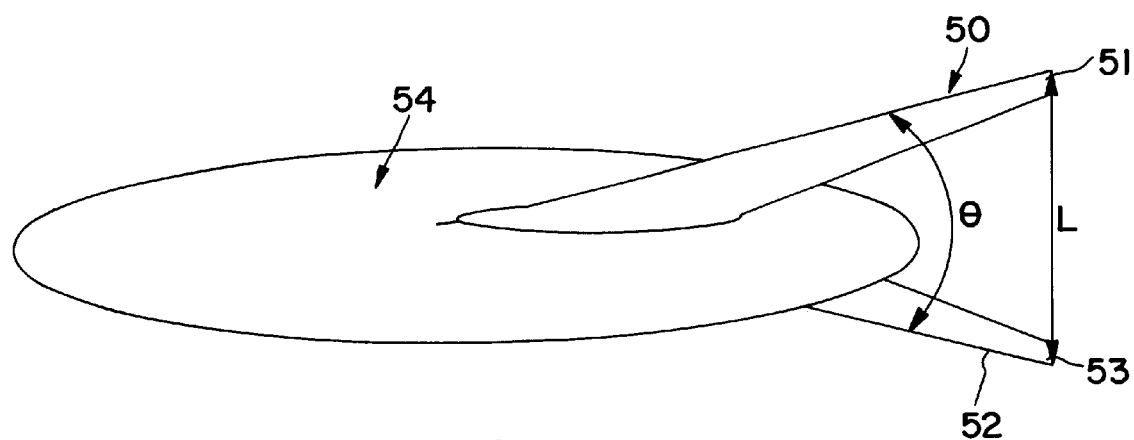
FIG. 3 is a simplified side view illustrating the post combustion oxidant sheet embodiment aspect of this invention.

FIG. 3 illustrates another preferred embodiment of the invention wherein at least two post combustion oxidant streams converge to form a post combustion oxidant sheet. Referring now to FIG. 3, first post combustion oxidant stream 50 is injected into the furnace from first post combustion nozzle 51 and second post combustion oxidant stream 52 is injected into the furnace from a second post combustion nozzle 53. The two post combustion nozzles are generally from 3 to 8 inches apart, typically about 4 inches apart, as shown by L in FIG. 3, and inject their respective post combustion oxidant streams at an angle toward each other so that they form an angle theta when the post combustion oxidant streams converge. Theta is generally within the range of from 5 to 45 degrees, preferably within the range of from 10 to 20 degrees, and typically about 12 degrees. The converging post combustion oxidant streams form a post combustion oxidant sheet 54 which serves to improve the contact of the oxygen of the post combustion oxidant with oxidizable species in the headspace of the electric arc furnace thereby improving the efficacy of the post combustion. The convergence of the post combustion oxidant streams to form the sheet serves to limit the penetration of each post combustion oxidant into the furnace while still retaining a high velocity for the post combustion oxidant streams.

Figure 4:
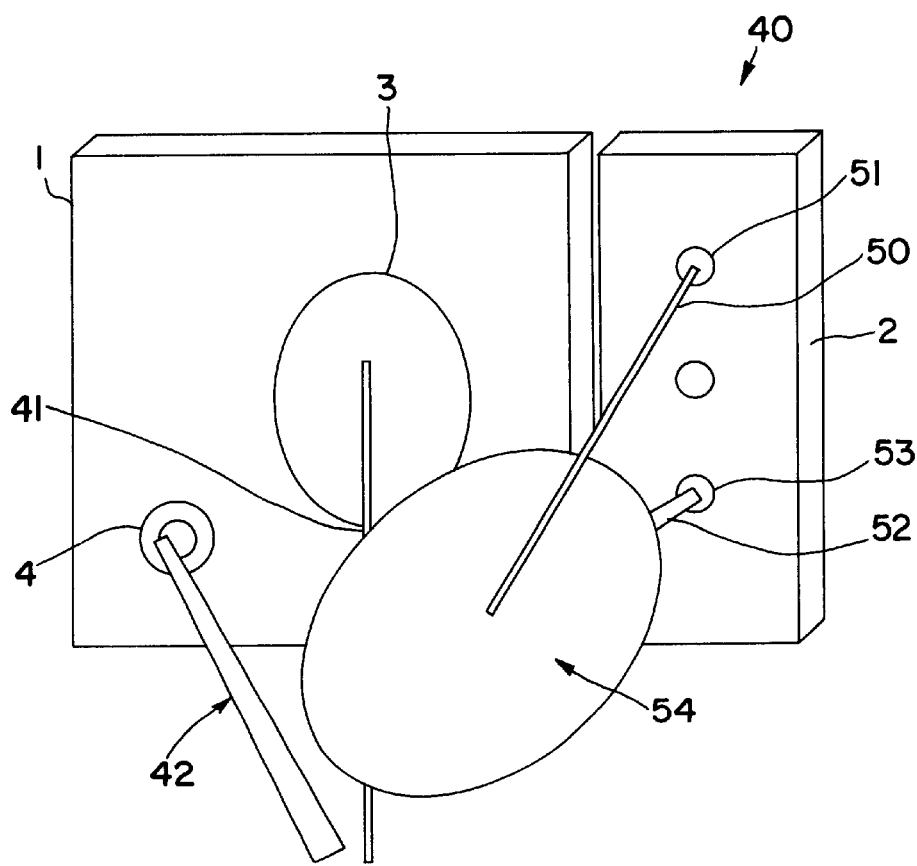
FIG. 4 is a head on view of one preferred embodiment of the quadrilateral panel or assembly of this invention using oxidant sheet post combustion practice.

FIG. 4 illustrates the operation of the invention using the post combustion oxidant sheet. The numerals of FIG. 4 are the same as those of FIGS. 2 and 3 for the common elements and these common-elements will not be described again in detail. Generally the downward angle of the post combustion oxidant sheet will be within the range of from 10 to 40 degrees from the horizontal, preferably within the range of from 20 to 30 degrees, and typically about 25 degrees.

Although the invention has been described in detail with reference to certain preferred embodiments, those skilled in the art will recognize that there are other embodiments of the invention within the spirit and the scope of the claims.

What is claimed is:

1. A quadrilateral assembly suitable for installation into a wall of an electric arc furnace comprising a coherent jet opening for providing a coherent jet of gas at a first downward angle into the electric arc furnace, a carbon injection nozzle below and/or to the side of the coherent jet opening, and at least one post combustion nozzle for providing at least one oxidant stream into the electric arc furnace, said oxidant stream(s) being at a second downward angle which is shallower than said first downward angle.

2. The quadrilateral assembly of claim 1 comprised of a first quadrilateral portion and a second quadrilateral portion, said first quadrilateral portion housing the coherent jet opening and the carbon injection nozzle and said second quadrilateral portion housing said post combustion nozzle (s).

3. The quadrilateral assembly of claim 1 wherein the carbon injection nozzle is below and to the side of the coherent jet opening.

4. The quadrilateral assembly of claim 1 having a plurality of post combustion nozzles for providing a plurality of oxidant streams into the electric arc furnace.

5. The quadrilateral assembly of claim 4 wherein at least two of the plurality of post combustion nozzles are oriented so that the respective oxidant streams from said nozzles have differing second downward angles.

6. A quadrilateral assembly suitable for installation into a wall of an electric arc furnace comprising a coherent jet opening for providing a coherent jet of gas at a downward angle into the electric arc furnace, a carbon injection nozzle below and/or to the side of the coherent jet opening, and a plurality of post combustion nozzles for providing a plurality of oxidant streams into the electric arc furnace, said post combustion nozzles oriented such that the oxidant streams converge to form a sheet of gas within the electric arc furnace.

7. The quadrilateral assembly of claim 6 comprised of a first quadrilateral portion and a second quadrilateral portion, said first quadrilateral portion housing the coherent jet opening and the carbon injector nozzle and said second quadrilateral portion housing said plurality of post combustion nozzles.

8. The quadrilateral assembly of claim 6 wherein the carbon injection nozzle is below and to the side of the coherent jet opening.

9. A method for providing gas into an electric arc furnace comprising passing a coherent jet of gas from a coherent jet opening of a quadrilateral assembly downwardly into the electric arc furnace at a first downward angle, passing a first stream of post combustion oxidant from a first post combustion nozzle of the quadrilateral assembly into the electric arc furnace at a second downward angle which is shallower than said first downward angle, passing a second stream of post combustion oxidant from a second post combustion nozzle of the quadrilateral assembly into the electric arc furnace at an angle so as to converge with the first stream of post combustion oxidant, and forming a sheet of post combustion oxidant from said first and second streams of post combustion oxidant within the electric arc furnace.

10. The method of claim 9 further comprising providing a stream of carbonaceous material into the electric arc furnace from a carbon injection nozzle of the quadrilateral assembly.

11. The method of claim 9 wherein the first downward angle is within the range of from 35 to 50 degrees.

12. The method of claim 9 wherein the second downward angle is within the range of from 20 to 30 degrees.

13. The method of claim 9 wherein the sheet of post combustion oxidant has a downward angle within the range of from 10 to 40 degrees.

14. The method of claim 9 wherein the coherent jet of gas has a supersonic velocity.

15. The method of claim 9 wherein the coherent jet of gas comprises oxygen.

16. The method of claim 9 wherein the coherent jet of gas comprises an inert gas.

* * * * *